July 21, 1953 — G. M. VLAJINAC — 2,646,216
AVERAGING DEVICE
Filed Feb. 21, 1949 — 2 Sheets-Sheet 1

INVENTOR
GOJKO VLAJINAC
BY
Jerome W. Paxton
Agent.

July 21, 1953  G. M. VLAJINAC  2,646,216
AVERAGING DEVICE
Filed Feb. 21, 1949  2 Sheets-Sheet 2

INVENTOR
GOJKO VLAJINAC
BY
Jerome W. Parton
Agent.

UNITED STATES PATENT OFFICE 2,646,216

AVERAGING DEVICE

Gojko M. Vlajinac, Lima, Peru

Application February 21, 1949, Serial No. 77,627
In France July 29, 1948

3 Claims. (Cl. 235—61)

My invention relates to an instrument for computing and indicating the average of a varying or fluctuating value, more particularly the average travel speed of a vehicle.

It is a general object of my invention to provide means giving at any time an indication of the average of a fluctuating value measured over a certain period of time, and, it is a more specific object to provide an instrument of simple and rugged structure automatically operable by a clock and by the usual speedometer of a motor car and adapted to indicate the average speed the car has travelled since the time of start on the trip, said average being computed automatically taking in consideration all stops, slowdowns, etc.

While my invention is particularly designed for speed measurements, it is equally applicable to other fluctuating values such as quantity, weight, length, pressure, temperature, R. P. M. or the like, the problem of measuring and indicating the average of such values being of frequent occurrence in the industry.

Further objects and features of my invention will appear from the detailed description following hereinafter and, more particularly, from an explanation of my invention with reference to two preferred embodiments shown in the drawings in which Fig. 1 shows a cross-section of a average-travel-speed indicator operable from a clock and a motor car speedometer;

Fig. 10 is a plan view of a spiral gear of which Fig. 4 shows a fragment;

Figure 1:
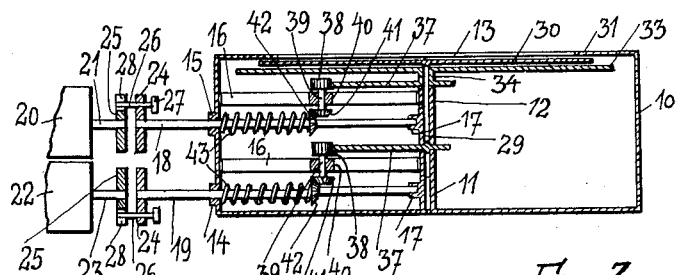

I shall now proceed to describe the mechanical details of the instrument illustrated in Figs. 1, 2, 3, 4, 6, 7, 8, 9 and 10 and shall then offer an explanation of the basic mathematical principle involved and of the function of the device.

A substantially cylindrical casing 10 is provided with axially located bearings 11 and 12 rigidly attached to the walls of the casing by suitable brackets (not shown), with a round window 13 in its face 31 and with two bearings 14 and 15 arranged one above the other in the peripheral wall of the casing. Moreover, casing 10 is provided with two pairs of parallel channel bars 16 extending radially from the peripheral wall of the casing to the bearing 11, or 12 respectively, as will appear from Figs. 1, 2 and 3. These channel bars which are parallel to the axes of the bearings 14 and 15 are likewise rigidly attached to casing 10. Axially aligned with the outer bearings 14 and 15 are inner bearings 17 attached to the bearings 11 and 12.

In the inner and outer bearings 14, 15 and 17 there are journalled two setting shafts 18 and 19 extending out of casing 10 and adapted to be clutched to a clock, or to a mileage meter respectively. The latter forms part of an instrument commonly known as the speedometer which is ordinarily not only adapted to indicate the speed of but also the mileage covered by the vehicle. As instruments of this kind are well known and require no detailed description, the speedometer is shown but diagrammatically at 20, a shaft 21 projecting therefrom being geared to the mileage indicator so as to rotate through a number of revolutions proportional to the distance covered by the vehicle. A clock is diagrammatically shown at 22, a shaft 23 projected therefrom being connected to the shaft of the minute-hand performing one revolution per hour.

The two shafts 21 and 23 are axially aligned with the shafts 18 and 19 and adapted to be clutched thereto. For this purpose the opposed ends of the shafts 18 and 21 have discs 24 and 25 attached to them. A bolt 26 provided with a knob 27 is slidable in the disc 24 and adapted to engage a recess 28 provided in the periphery of the disc 25. As will be explained later, the recess 28 is so wide as to afford a lost motion of shaft 21 which will be taken up in the course of a travel of 10 miles.

A similar clutch is provided between the shafts 23 and 19. The lost motion of that clutch is so chosen that it amounts to an angle of 36 degrees and, therefore, will be taken up within 6 minutes, when the clock is running.

By withdrawal of the bolts both clutches can be disengaged for the purpose of restoring the instrument to its initial condition.

Journalled within the bearings 11 and 12, there is a shaft 29 to which a disc 30 is affixed located directly beneath the window 13. It will appear from Figs. 7, 8 and 9, the disc 30 is provided near its periphery with an aperture 32 visible through the window 13. Rotatably mounted on shaft 29 between bearing 12 and disc 30 directly inside the latter is a hollow shaft 34 carrying a second disc 33 of a slightly larger diameter than disc 30. The two shafts 29 and 34 constitute movable elements individual co-ordinated to the two setting shafts 18 and 19 to be actuated thereby.

Figure 2:
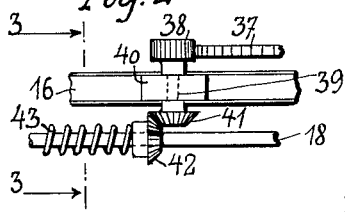
Fig. 2 illustrates a detail of Fig. 1 on an enlarged scale.
Figure 3:
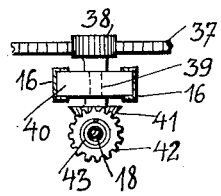
Fig. 3 is a sectional view, the section being taken along line 3—3 of Fig. 2.
Figure 4:
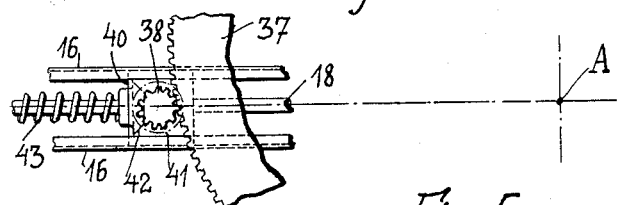
Fig. 4 is a plan view of the mechanism shown in Fig. 2.

For the purpose of such actuation, each setting shaft is co-operatively connected with its co-ordinated movable element by a variable transmission illustrated in Figs. 2, 3 and 4.

These two transmissions are so designed that they have a variable ratio of transmission imparting to the movable elements 29 and 34 a relative displacement proportional to the average speed to be indicated.

The two discs 30 and 33 constitute an indicator for such relative displacement. For that purpose, disc 33 is provided with a scale 35, Fig. 6, exposed to view by the aperture 32 of the overlying disc 30 said scale being provided with numerals representing the average speed. For sake of clarity of the drawings, such numerals are not shown. Disc 30 is provided with an indicating mark such as an arrow 36, Fig. 7, pointing to the middle of the aperture 32. This arrow 36 will indicate the average travel speed on scale 35, when the instrument is in operation.

I shall now describe the peculiar transmissions referred to. As both are identical in design, it will be sufficient to describe one of them hereinafter.

Figure 10:
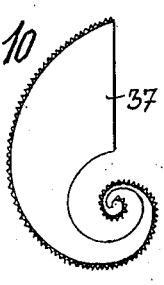

On the movable element 29, or 34 respectively, there is mounted a spiral disc 37 a plan view of which is shown in Fig. 10. This spiral disc is kept in a non-slipping driving engagement with a pinion 38 co-operatively connected to the co-ordinated setting shaft 18, or 19 respectively. While a number of means are well known in the art to secure a non-slipping driving engagement between a pinion and a disc, and while I do not wish to limit the scope of my invention to any particular means of that kind, a particularly effective and simple arrangement will result from the use of teeth provided on the peripheries of the pinion and the disc, so that both constitute gears proper.

Figure 9:
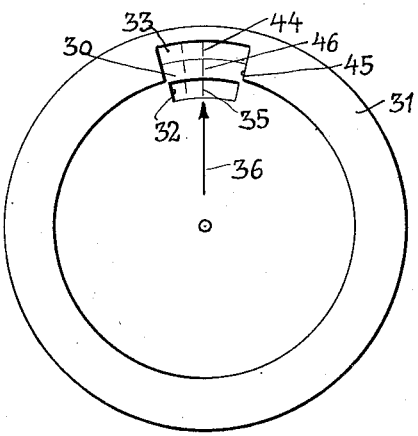
Fig. 9 is a partial plan view of Fig. 1.

The pinion 38 is attached to a stub-shaft 39 journalled in a block 40 slidable between the channel bars 16, the shaft 39 projecting beneath the block or slide 40 and having a bevel gear 41 attached to it. The bevel gear 41 meshes with a bevel gear 42 which is slidably mounted on the setting shaft 18, or 19 respectively, for common rotation therewith. To that end, the section of the setting shaft located between its bearings may have a square cross-section, as shown in Fig. 3. A helical spring 43 surrounding the setting shaft between its outer bearing and the bevel gear 42 holds the latter resiliently in engagement with the bevel gear 41 and thus urges the slide 40 inwardly, whereby the pinion 38 is held in engagement with the spiral disc 37 irrespective of the angular position of the latter. As will appear from Fig. 10, the toothed spiral contour of disc 37 extends through at least two complete convolutions so that the movable elements 29 and 34 may be turned 2 times 360 degrees by their co-ordinated setting shafts 18, or 19 respectively. The spiral represented by the toothed edge of disc 37 is so designed that rotation of setting shaft 18 from its normal position through $m$ revolutions results in a turn of the movable element 34 through an angle proportional to log $m$. The disc 33 may be provided with a second scale 44 adjacent its periphery and this scale 44 may be exposed to view by a recess 45 provided in the face 31 of the casing 10 as shown in Fig. 9. Scale 44 is provided with two sets of numerals not shown and one of the two numerals appearing in the center of recess 45 indicates the strip mileage as will be explained later.

If desired, the time may be likewise indicated by the same instrument. For this purpose disc 30 may be provided with a scale 46, Fig. 7, having inscribed numerals (not shown) to give indication of the time in the recess 45 below the mileage indication.

Having described the mechanical details of the illustrated embodiment of my invention, I shall now explain the underlying theory and its function.

The speed of a body performing a continuous uniform motion is constant amounting, as it does, to the quotient of the distance $s$ divided by the time $t$ according to the formula:

$$c = \frac{s}{t}$$

If the motion is variable, the speed changes and such change may or may not follow a predetermined law. If the motion has a constant acceleration or deceleration, the average speed is the medium of the initial speed and the final speed according to the formula $$V = \frac{Vo + Ve}{2}$$

If the motion does not follow a predetermined law—this applies to vehicles as a rule—the average speed can be computed by dividing the distance by the time required to cover such distance. The above described instrument automatically performs such division to give a continuous immediate indication of the average speed.

This division is performed by the subtraction of arcs corresponding to the logarithms of distance and time. The resulting arc is proportional to the logarithms of the result sought and is, therefore, representative of the average speed. This principle will be readily understood from a comparison of my instrument with an ordinary computing sliding rule. The two concentric scales 44 and 46, Fig. 8, constitute logarithms, the outer scale 44 representing the distance in miles and the inner scale 46 the time in hours. The third scale 35 on disc 33 permits of a computation of the average speed by simple subtraction of the time angle from the distance angle on the well known principle of the computing sliding rule. As the two dials 30 and 33 are driven automatically one by the clock 22 and the other one by the mile counter 20 of the speedometer, the rotary sliding rule will be set automatically at any time so as to exhibit the result of the computation in window 32. Obviously, however, the motion of the mileage counter 20 and of the clock 22 must be transformed into their logarithmic equivalents to be imparted to the two dials 30 and 33. This is the function of the interposed transmission using the principle of the logarithmic spiral. The transformation of the values introduced by the setting shafts 18 and 19 into their logarithmic equivalents means, for instance, that on scale 46 the arc or angle representing one hour is not constant but varies. The arc from 9 to 10 hours is 6.58 times smaller than the arc from one to 2 hours and 21.86 times smaller than the arc from .1 hour (i. e. 6 minutes) to 1 hour. How these figures are computed, will be shown later.

Figure 11:
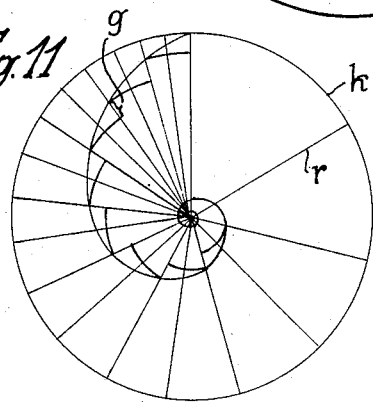
Fig. 11 is a geometrical figure illustrating certain characteristics of a logarithmic spiral.

I have discovered that the above explained transformation of the basic values into their logarithmic values may be carried out by means of the variable transmissions described using as an element the logarithmic spiral disc. Fig. 11 shows the logarithmic spiral. If $r$ is the distance of a point on this curve from the center, if $\varphi$ is the angle between this radius and a basic line, and if $g$ is a constant increment of the radius $r$ between every two successive numbers $n$ and $n+1$, the following formula are characteristic:

(1) $r = g.n$ in which $n$ are the numbers from 1 to 10
(2) $\varphi = 2\pi.\log n$ in radians or $\varphi = 360.\log n$ in degrees
(3) $s = g.k$ in which $s$ is the length of an arc of the spiral between every two successive numbers $n$ and $n+1$ and $k$ is a constant.

The second formula permits to design the scales. If we take, for instance, a logarithmic spiral with two convolutions the following calibration of the scales on the discs 30 and 33 can be chosen:

| n | 1 | 2 | 3 | 4 | 5 | 6 | 7 | 8 | 9 | 10 |
|---|---|---|---|---|---|---|---|---|---|---|
| for the distance | 10 | 20 | 30 | 40 | 50 | 60 | 70 | 80 | 90 | 100 |
| disc 33 | 100 | 200 | 300 | 400 | 500 | 600 | 700 | 800 | 900 | 1000 |

For the average speed:

10  20  30  40  50  60  70  80  90  100
100 200 300 etc.

disc 30 for the time:

6'  12'  18'  24'  30'  36'  42'  48'  54'  1ʰ
1ʰ  2ʰ   3ʰ   4ʰ   5ʰ   6ʰ   7ʰ   8ʰ   9ʰ   10ʰ

Hence, each line of the scales may denote one of two values, e. g. line #3 of scale 33 either 18 minutes or 3 hours. It will not be difficult for the driver of the car to realize which of these two figures is the right one. The allotment of two values to each point of the scales results from the fact that the spiral of the gear 37 has two convolutions.

The disc 33 must perform two complete revolutions for the distance of 1000 miles. Similarly, the disc 30 must perform two complete revolutions within ten hours. The first revolution of disc 33 takes place during the travel from the 10th to the 100th mile and the second revolution during the travel from the 100th to the 1000th mile. Similarly the disc 30 performs its first revolution from the 6th to the 60th minute and the second revolution from the 1st to the 10th hour. Hence, my instrument may be used on trips covering up to 1000 miles and not exceeding 10 hours. It will directly indicate, within the aperture 32, the average speed in miles per hour beginning its work from the 10th mile on.

It follows from the above Formula 3 that any revolution of the pinion 38 results in an increase of the co-ordinated radius $r$ of gear 37 by a constant increment designated in Fig. 11 by $g$. The ratio of transmission is $$\frac{R}{r}$$

in which R is the radius of the pinion. Hence, the ratio of transmission is inversely proportional to the number of revolutions of the pinion. As the vehicle proceeds on its trip, the ratio of both transmissions decreases more and more.

The scale on the periphery of the circle $k$, Fig. 11, will follow from the formula $\varphi = 2\pi \log n$ in which $n$ is one of the numbers from .1 to 1 and from 1 to 10 allotted to the lines of the scale and in which $\varphi$ is the angle. For $n=1$, $\varphi$ amounts to 0. For $n=.1$ or $n=10$, $\varphi$ amounts to 360 degrees. According to the formula $r = g.n$ in which $g$ is the constant increment denoting the increase of the radius between two successive numbers $n$ and $n+1$, the following table is obtained with $g = 7$ mm:

| n= | 1 | 2 | 3 | 4 | 5 | 6 | 7 | 8 | 9 | 10 |
|---|---|---|---|---|---|---|---|---|---|---|
| r= | 7 | 14 | 21 | 28 | 35 | 42 | 49 | 56 | 63 | 70 |

The logarithmic spiral shown in Figure 11 obtained by computing for figures $n$ first the various angles $\varphi$ and by then the various amounts of $r$ transferring the latter from the center in the proper direction. A line connecting the points so obtained constitutes the logarithmic spiral. For the numbers $n$ from .1 to 10 the spiral has two complete convolutions, the first one from .1 to 1 and the second from 1 to 10.

The clutch connecting shafts 23 and 19 has so much lost motion that the setting-shaft 19 will be picked up after 6 minutes have passed since the starting of the clock 23. Similarly, the clutch connecting shafts 21 and 18 has so much lost motion that shaft 18 will be picked up after the first 10 miles of the trip have been covered. Therefore, the instrument will not be operative to indicate the average speed until at least 6 minutes have passed and at least ten miles have been covered. Nevertheless, the first 6 minutes are taken in consideration by my instrument, because the initial line of the scale 44 corresponds to ten miles, the two discs 30 and 33 acting as a computing sliding rule immediately after commencement of their rotation taking in consideration the initial 10 miles already indicated.

If it is desired to measure the average speed during actual movement of the vehicle only, the clock 22 must be stopped during interruption of the trip and must be started again when the travel is resumed. If the clock 22 continues to run during stops of the vehicle, this has the effect of such a relative displacement of the two discs or dials 30 and 33 that the indicated result is automatically reduced, as the time passes.

Figure 5:
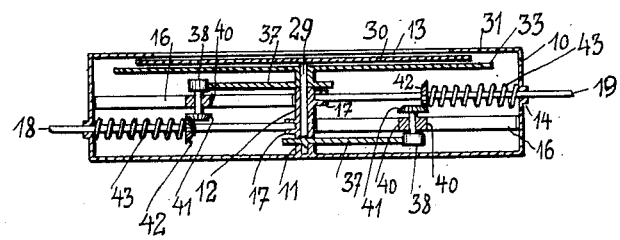
Fig. 5 illustrates a modified embodiment giving a view similar to that of Fig. 1.
Figure 6:
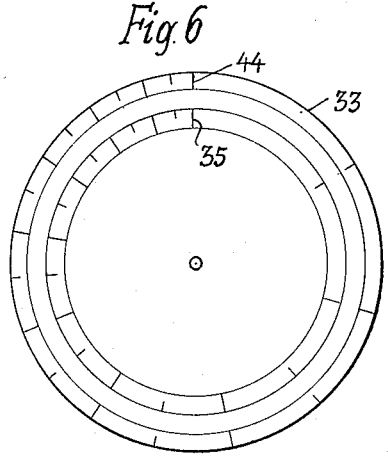
Figs. 6 and 7 are plan views of two elements shown in section in Fig. 1.
Figure 7:
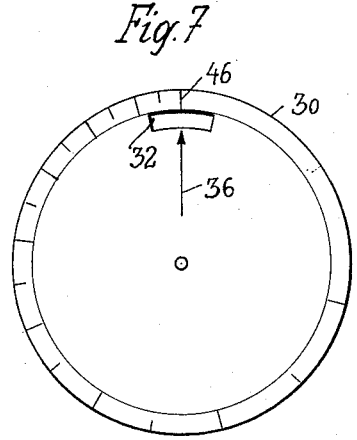

A modification of the instrument is illustrated in Fig. 5. In this embodiment, the two setting shafts 18 and 19 are arranged on opposite sides of the axes of the casing 10. This results in a more compact structure.

Figure 8:
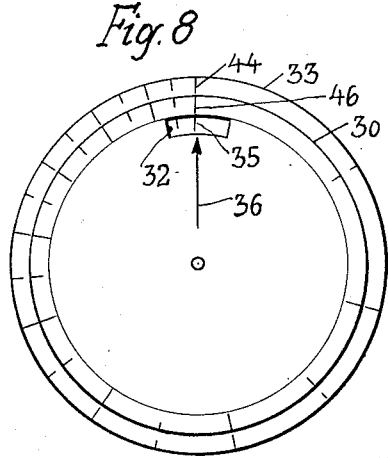
Fig. 8 illustrates the two elements shown in Figs. 6 and 7 in co-operative relationship.

Either upon completion of a trip or of 1000 miles, or after ten hours have passed since the operation of the instrument was started, same must be restored to its initial position in which the pinion 38 engages the innermost end of the spiral gear 37 and the dials 30 and 33 are in starting position shown in Fig. 8. This resetting operation may be accomplished by withdrawing the two pins 26 from engagement with the recessed clutch plate and by manually rotating the setting shafts 18 and 19 backwards until the two dials 30 and 33 have returned to their initial position. However, means for disengaging pinions 38 thus allowing the two dials to return to their initial position under spring action may be easily designed by any one skilled in the art.

The continuous immediate indication of the average speed offers a valuable aid to the driver of a motor car in reaching a certain goal in a given time. If he wants to cover 300 miles for instance in ten hours, he must maintain an average of 30 miles per hour. My instrument will tell him at any time whether he is on due schedule or can slow down or must speed up.

While my invention lends itself particularly to the automatic computation of the average speed of a vehicle, it may be used to compute the average of other variables. Thus, the instrument 20 may be one measuring the length of textile webs or of paper webs or measuring fluctuating pressure or the intensity of a flow of liquid. My new variable transmission may be used with advantage to automatically compute the result obtained by multiplying or dividing two values, more particularly to compute products of time with a variable, such as length, rotary speed, quantities, pressures etc. If desired, a gear shift transmission may be interposed between the shafts 23 and 19 permitting at the option of the operator to use a direct transmission of a 1 : 10 transmission so that the same instrument may be used for a period of time from 6 minutes to 10 hours or from 36 seconds to 1 hour. A similar transmission interposed between shafts 21 and 18 permits the use of the instrument for trips from 10 to 1000 miles or for trips from 1 to 100 miles.

Preferably, the pinions 38 are made slightly conical whereby any lost motion between the pinion and the gear may be eliminated by axial adjustment of the pinion.

While the two dials 30 and 33 constitute a very simple indicator showing the relative displacement of the movable elements 29 and 34, obviously any other indicator may be used for the same purpose. It is by no means a necessary requirement that the indicator be composed of rotary elements.

While each of the scales 44, 46 and 35 are provided with two sets of numerals, it is possible to arrange for three or more sets of numerals. Thus it is possible to accommodate three logarithmic scales each for two sets of numerals, each scale being distributed over an arc of 240 degrees. In that case, distances from 10 to 10,000 miles and a time from 6 minutes to 100 hours may be covered.

It will be appreciated that the time-controlled disc 30 need not be provided with the scale 46 and, in the absence thereof, constitutes a pointer in effect which may be replaced by a simple hand indicating the average speed on scale 35.

While I have described my invention hereinabove by reference to two specific embodiments thereof, I wish it to be clearly understood that it is in no way limited to such embodiments but is capable of numerous modifications within the scope of the appended claims.

The term "variable transmission" occurring in the claim is intended to cover any mechanism operable by the setting shaft and having the effect that the movable element performs a concurrent motion of a clearly defined extent.

What I claim is:

1. In a measuring instrument for automatically indicating the average speed of a moving body having a rotatable element, a second rotatable element concentrically mounted with respect to the first named rotatable element, each of said rotatable elements being movable from a normal position to a set position, the first named rotatable element having two concentrically arranged scales in logarithmic graduation thereon, one of said scales denoting average speed and the other of the scales distance in miles, the said second named rotatable element being provided with a scale in logarithmic graduation denoting the time in hours, means adapted to rotate the first named rotatable element proportional to the distance covered by the moving body, further means adapted to rotate the second named rotatable element at a uniform speed, and a drive assembly operatively connecting each of said drive means with said rotatable elements, each of said drive assemblies including a curved gear having a logarithmic spiral adjusted to the logarithmic scale graduation connected to the said rotatable element, a pinion meshing with said curved gear and movable radially in a straight line respecting said curved gear, a complemental gear operatively connected to said drive means and movable toward and away from said pinion, and spring means acting on said complemental gear to urge said gear into engagement with the curved gear.

2. A measuring device as defined in and claimed by claim 1 further characterized in that the scale on the first named rotatable element denoting average speed is visible through an elongated slot provided in the second named rotatable element, the second named rotatable element having an indicator located in approximately the center of the elongated slot.

3. A measuring device as defined in and claimed by claim 1 wherein the drive connection between the drive means and the first named rotatable element includes a coupling whereby said element is rotated only after a predetermined distance has been covered and wherein the drive connection between the second named rotatable element and its drive means includes a coupling whereby said second rotatable element becomes effective only after a predetermined time interval.

GOJKO M. VLAJINAC.

References Cited in the file of this patent

UNITED STATES PATENTS

| Number | Name | Date |
|---|---|---|
| 1,889,876 | Pellerin et al. | Dec. 6, 1932 |
| 1,903,677 | Hutchison, Jr. | Apr. 11, 1933 |

FOREIGN PATENTS

| Number | Country | Date |
|---|---|---|
| 274,285 | Great Britain | July 21, 1927 |
| 399,653 | Great Britain | Oct. 12, 1933 |
| 627,729 | France | Oct. 11, 1927 |